United States Patent [19]

Imai

[11] 4,347,992
[45] Sep. 7, 1982

[54] WEBBING TAKE-UP DEVICE
[75] Inventor: Hironobu Imai, Fujisawa, Japan
[73] Assignee: NSK-Warner K.K., Tokyo, Japan
[21] Appl. No.: 175,916
[22] Filed: Aug. 6, 1980
[30] Foreign Application Priority Data Aug. 10, 1979 [JP] Japan .............................. 54-109452[U]

[51] Int. Cl.³ .............................................. B65H 75/18
[52] U.S. Cl. .............................. 242/68.4; 242/107.4 R; 308/15
[58] Field of Search ............................ 242/107-107.7, 242/68.4, 129.6, 129.62; 308/30, 27, 22, 15; 297/475-478; 280/803, 806, 807

[56]  References Cited
U.S. PATENT DOCUMENTS

| | | | |
|---|---|---|---|
| 3,307,291 | 3/1967 | Cremer | 308/15 X |
| 3,317,936 | 5/1967 | Johnson et al. | 242/107 |
| 3,366,356 | 1/1968 | Fisher | 308/22 X |
| 3,584,923 | 6/1971 | Goossens | 308/15 |
| 3,692,253 | 9/1972 | Curran | 242/107.4 R |
| 4,014,426 | 3/1977 | Neufeld | 242/68.4 X |
| 4,244,600 | 1/1981 | Takada | 242/107.4 A |

Primary Examiner—John M. Jillions
Attorney, Agent, or Firm—Shapiro and Shapiro

[57] ABSTRACT

A webbing take-up device has a base member having a bottom portion and side plate portions rising from the opposite side edges of the bottom portion and opposed to each other, and a reel assembly rotatably supported in bearing holes formed at the central portion of the side plate portions in opposed relationship with each other. At least one of the side plate portions is formed with a cut-away extending from the bearing hole in a direction generally opposite to webbing draw-out direction and having a width greater than the diameter of the end of the reel assembly leading to the outer periphery of the side plate portion. The ends of the reel assembly are received in the bearing holes through the cut-away or the cut-aways and are rotatably supported by bushing members inserted in the bearing holes or the bushing member and bearing hole. The cut-away or the side plate portion is provided with means cooperable with the slip-out preventing means of the bushing member to fix the bushing member at a predetermined position.

10 Claims, 9 Drawing Figures

WEBBING TAKE-UP DEVICE

BACKGROUND OF THE INVENTION

1. Field of the Invention

This invention relates to a webbing take-up device which is easy to assemble.

2. Description of the Prior Art

Heretofore, in order to incorporate a reel assembly such as a webbing take-up shaft assembly or a latch assembly into the base member of a webbing take-up device (hereinafter referred to as a retractor), it has been necessary to incorporate webbing at the same time and this has led to cumbersomeness of the assembly and many disadvantages in the flow of the assembling work.

SUMMARY OF THE INVENTION

In view of such disadvantages, it is an object of the present invention to provide a retractor which is easy to assemble and which enables the assemblage of a reel assembly to the base member and the assemblage of webbing to the reel assembly to be carried out independently.

To achieve such object, in the present invention, a cut-away extending from at least one bearing hole of the base member to the outer periphery thereof is formed and a reel assembly is rotatably supported by bushing members fitted in said cut-aways or the bushing member and said bearing hole.

The invention will become fully apparent from the following detailed description thereof taken in conjunction with the accompanying drawings.

DESCRIPTION OF THE PREFERRED EMBODIMENTS

Embodiments of the present invention will hereinafter be described.

Figure 1:
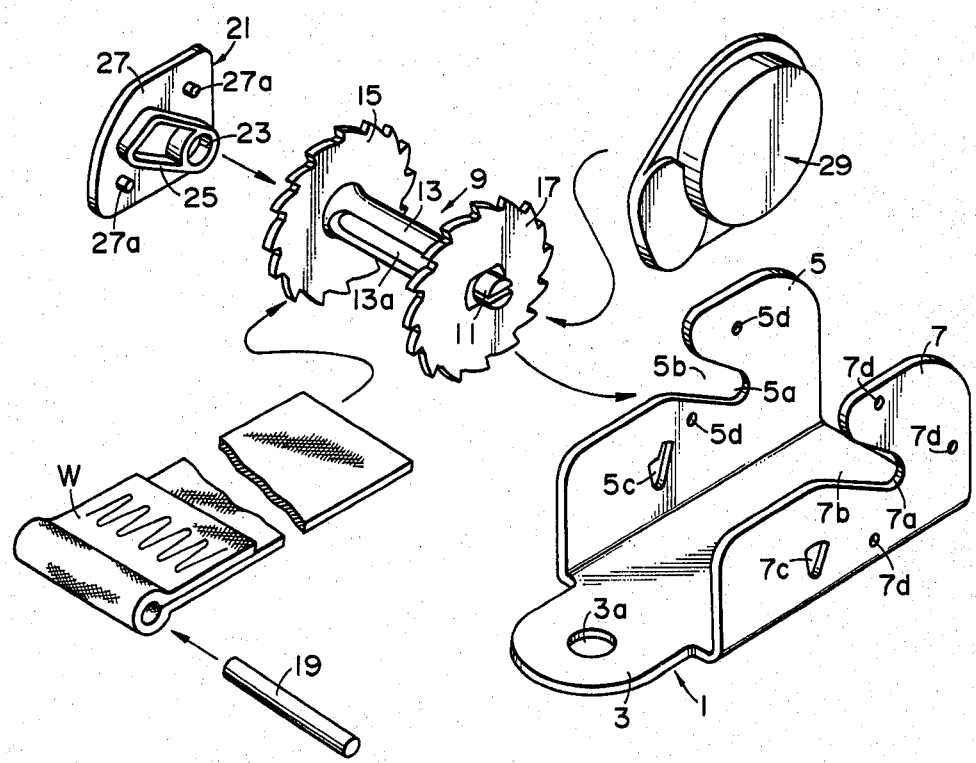
FIG. 1 is an exploded perspective view of essential parts of a first embodiment of the present invention.

FIG. 1 shows essential parts of a first embodiment of the present invention.

The base member 1 of a retractor has a bottom portion 3 and a pair of side plate portions 5, 7 rising from the opposite side edges of the bottom portion and opposed to each other. In one end portion of the bottom portion 3, there is formed a circular hole 3a through which a clamping member for securing the retractor at a suitable location may be passed. The opposite side plate portions 5 and 7 are formed with bearing holes 5a and 7a in which the ends 11 (only one of which is seen in FIG. 1) of a latch assembly 9 which is a reel assembly may be received. There are also formed gradually widening cut-aways 5b and 7b extending leftwardly and upwardly from at least one of the bearing holes (in the embodiment, from both bearing holes) as viewed in FIG. 1 so that the bearing holes form closed ends of the cut-aways. Since the present embodiment is an automatic locking type or an emergency locking type retractor, latch plates 15 and 17 are forced onto the opposite ends of the shaft 13 of the reel assembly 9. That is, these latch plate 15 and 17, when necessary, mesh with unshown locking plate tiltable in sector holes 5c and 7c of the side plate portions 5 and 7 by unshown means, thereby preventing rotation of the reel assembly 9 in webbing draw-out direction. The automatic locking or emergency locking mechanism itself is not shown because it is not directly related to the present invention.

The shaft 13 is formed with two opposed webbing threading holes 13a (in FIG. 1, only one of such holes which is greater in width and through which a pin 19 may pass is seen), and the webbing W prevented from slipping out of a narrower hole by a webbing set pin 19 goes out from this narrower hole and is wrapped about the shaft 13.

The unseen end of the reel assembly 9 is fitted into the annular portion 23 of a bushing member 21 and supported by the bearing hole 5a. The bushing member 21 further has a guide rib portion 25 and a flange portion 27 having a pin 27a studded therein, and when this has been completely incorporated, the rib portion 25 closely fits in the cut-away 5b and the pin 27a fits in the small hole 5d of the side plate portion 5, whereby the bushing member 21 is fixed onto the side plate portion 5.

Figure 2:
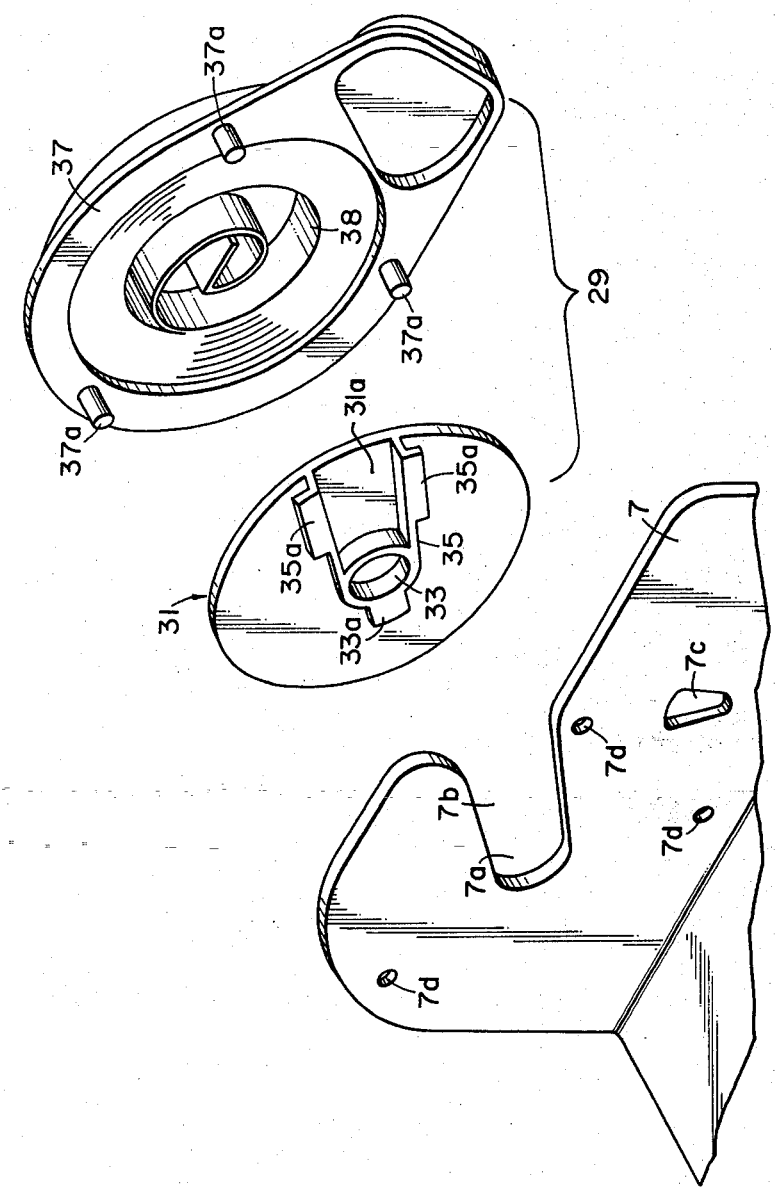
FIG. 2 is an exploded perspective view showing the details of the take-up spring assembly of the first embodiment.

On the other hand, the end 11 of the reel assembly 9 is also supported in the bearing hole 7a through a bushing member. This will be described in detail with reference to FIG. 2. This bushing member 31 has a plate portion serving also as a plate for a take-up spring 38 biasing the reel assembly 9 in webbing take-up direction, an annular portion 33 in the form of an uninterrupted circular ring, provided with an outer slip-out preventing rib 33a onto which the end 11 is fitted, and rib portions 35 each having an outer slip-out preventing rib 35a. When the bushing member is received in cut-away 7b ribs 33a and 35a prevent its lateral removal. Between rib portions 35 is a web portion 31a which connects the rib portions to annular portion 33. When a take-up spring assembly 29 has been completely incorported, the inner end of the spring 38 is received in the slit of the end 11 and the bushing member 31 is positioned by being fitted in the spring containing portion of a spring cover 37, and the pin 37a of the spring cover 37 is fitted into the small hole 7d of the side plate portion 7, whereby the bushing member 31 is fixed at a predetermined position.

From the foregoing construction, it will be apparent that the incorporation of the webbing into the reel assembly 9 and the incorporation of the webbing into the base member 1 can be effected in separate steps.

As will be seen from the foregoing description of the first embodiment, the type of the retractor to which the present invention is applied may be any of the non-locking type, the automatic locking type and the emergency locking type. That is, in the non-locking type, the latch plate of the reel assembly 9 may be a flange. Accordingly, in the ensuing description, the base member, etc. which are the characteristic portions of each embodiment will only be mentioned.

Figure 3:
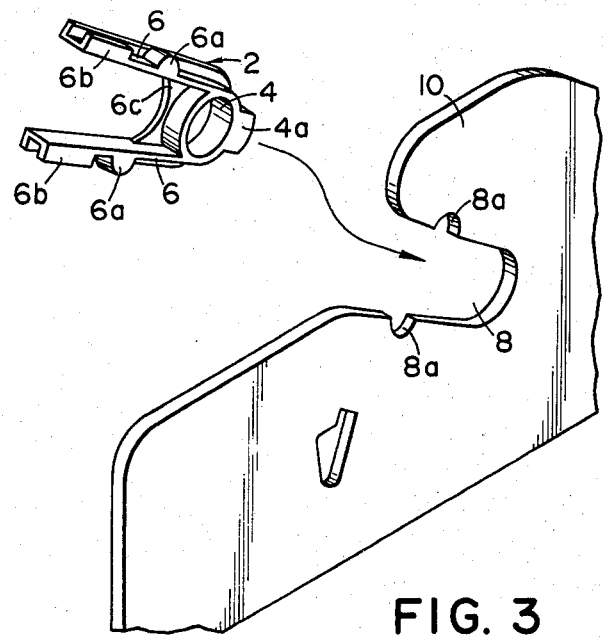
FIGS. 3 and 4 are exploded perspective views of the characteristic portions of a second and a third embodiment, respectively.

A second embodiment shown in FIG. 3 will now be described. In the second embodiment, a bushing member 2 has an annular portion 4 again in the form of an uninterrupted circular ring provided with an outer slip-out preventing rib 4a, and rib portions 6 extending from the annular portion 4 while slightly widening the spacing therebetween. Each rib portion 6 has an outer projection 6a at an intermediate part thereof, and the outer end portion forms a portion 6b of U-shaped cross-section. The bushing member 2 may be inserted into a cut-away 8 by slightly inwardly flexing the outer end portions of the ribs 6 and inserting the bushing member from the outer peripheral portion of the cut-away. Accordingly, the bushing member 2 is fixed at a predetermined position with the outer end portions 6b of the rib portions 6 engaged with the inner and outer surfaces of a side plate portion 10 which form the edges of the cut-away 8 to thereby prevent lateral removal of the bushing member and with the projection 6a fitted in the recesses 8a of the cut-away 8 to fix the position of the bushing member lengthwise and prevent lengthwise removal of the bushing member. Again, a web portion 6c, between the rib portions, connects the rib portions to the annular portion.

Figure 4:
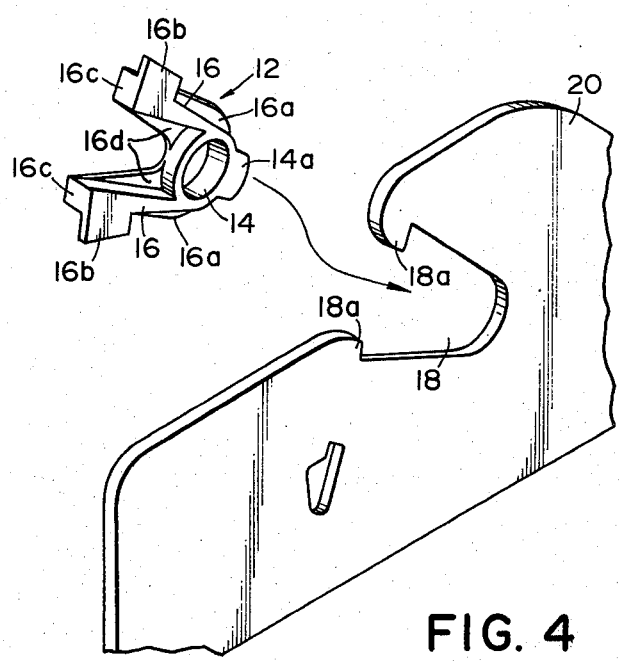

A third embodiment will now be described with reference to FIG. 4. In the third embodiment, a bushing member 12 has an annular portion 14 in the form of an uninterrupted circular ring provided with an outer slip-out preventing rib 14a, and rib portions 16 extending from the annular portion 14 while slightly widening the spacing therebetween and provided with inner and outer slip-out preventing ribs 16a, 16b. In this embodiment, inwardly projected portions 18a are formed at the entrance portion of the cut-away 18 of a side plate portion 20, and these inwardly projected portions are engaged with the end faces 16c of the bushing member 12 when fitted into the cut-away 18, thereby fixing the lengthwise position and preventing lengthwise removal of the bushing member 12. This bushing member 12 may also be inserted into the cut-away from the outer peripheral portion thereof by being inwardly flexed. As in the previous embodiments the ribs 16a, 16b embrace the edges of the side plate portion defining the cut-away to prevent lateral removal of the bushing member. Web portions 16d between the rib portions connect the rib portions to the annular portion.

Figure 5:
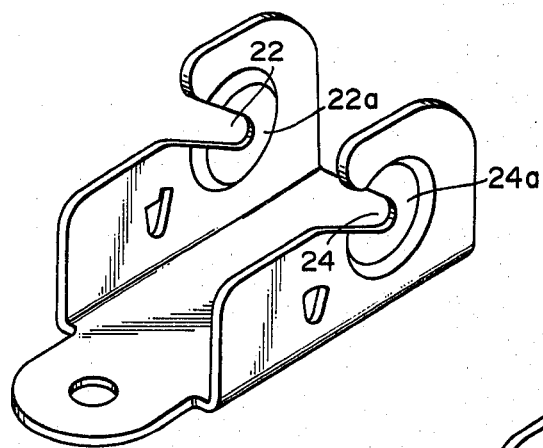
FIGS. 5 and 6 are perspective views of the characteristic portions of examples which are modifications of the above-mentioned embodiments.
Figure 6:
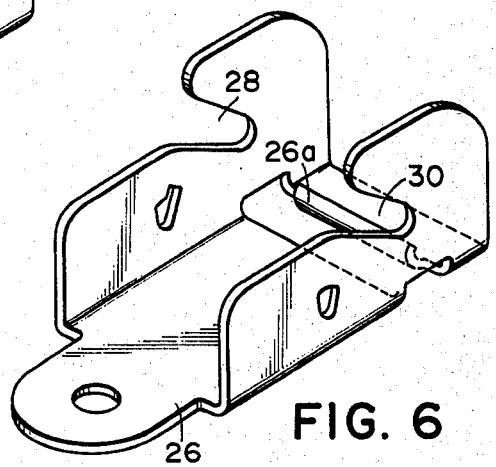

Reference now will be made to FIGS. 5 and 6 to describe what can be modifications of the above-described embodiments in which contrivance has been made to prevent deformation of the bearing holes when a load is applied.

In the example of FIG. 5, there are drawing-machined portions 22a and 24a around bearing holes 22 and 24, respectively. By these, concentration of stress may be avoided to achieve the above-mentioned object.

In the example of FIG. 6, a slot 26a is formed through a bottom portion 26 so that webbing can go out of the retractor therethrough. Accordingly, the webbing draw-out direction and the direction in which cut-aways 28, 30 extend are made more opposite to each other than in the above-described embodiments, and the end portion of the reel assembly is supported by the bearing holes with a great area of contact, thereby achieving the above-mentioned object.

Figure 7:
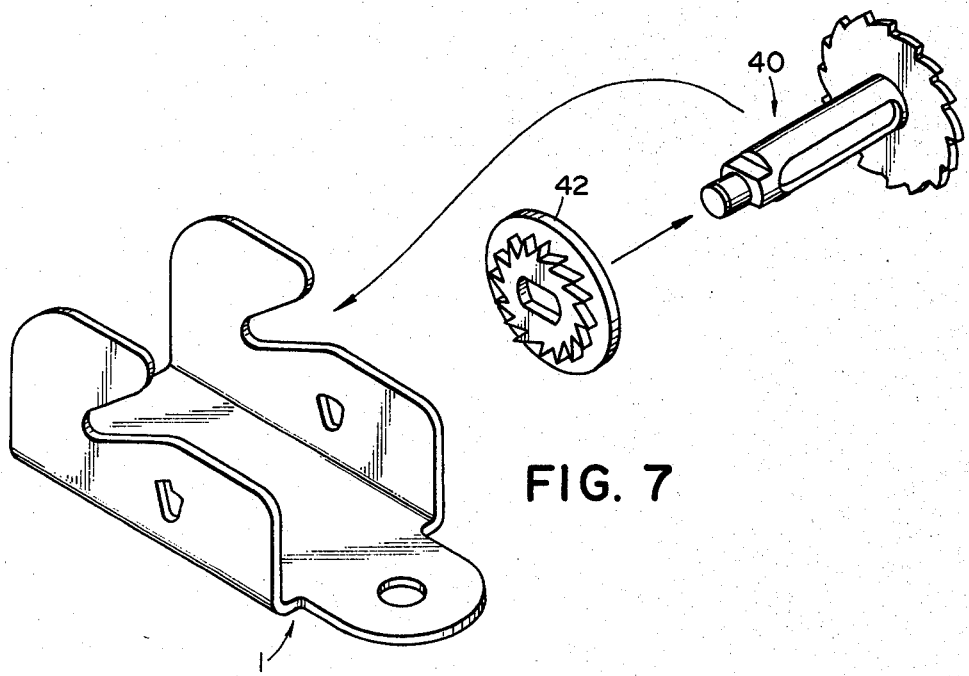
FIG. 7 is a perspective view of a single-tooth latch assembly usable with the present invention.

FIG. 7 shows a single-tooth latch assembly (40) usable in an automatic locking type or emergency locking type retractor and an integral ratchet gear type webbing center rest preventing plate 42 adapted to be inserted over the other end of the latch assembly 40. This eliminates the necessity of further fitting a separate ratchet gear and is therefore convenient in manufacture.

Figure 8:
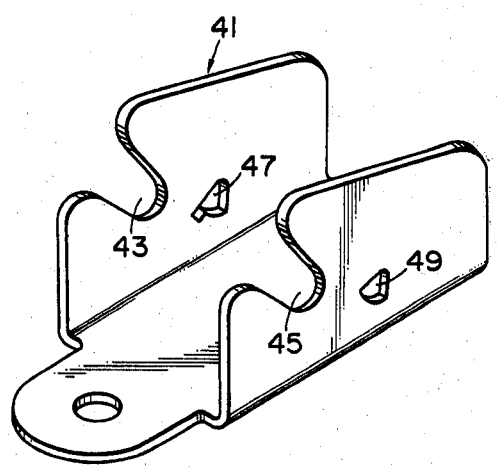
FIGS. 8 and 9 are perspective views of base members designed so that a latch plate does not slip out from a brake.
Figure 9:
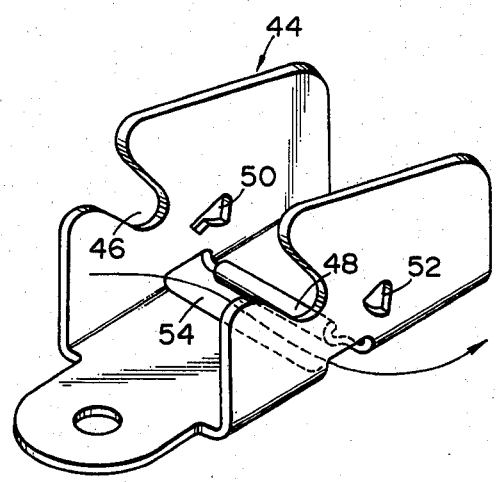

FIGS. 8 and 9 show base members 41 and 44 formed with locking plate sector holes 47, 49, 50, 52, at such positions that when a load has been applied, the latch plate is not disengaged from the locking plate in these sector holes due to deformation of bearing holes 43, 45, 46, 48. In the base member 44 of FIG. 9, the webbing is drawn out through a slot 54 in the direction of arrow and thus, deformation of the bearing holes is not liable to occur.

Thus, according to the present invention, the assemblage of the reel assembly and the assembly thereof to the base member can be carried out in separate steps, and a reduced number of assembling steps and improved assembling work are realized and further, efficient manual assembly as well as automatized assembling work can be realized.

I claim:

1. A webbing take-up device having a base member with opposed side plate portions, a reel assembly carried between the side plate portions and mounting means for mounting opposite ends of the reel assembly in the respective side plate portions, wherein the mounting means for at least one end of the reel assembly comprises a cut-away formed in the respective side plate portion from the outer periphery thereof, and a bushing member fitting in the cut-away, the bushing member including an annular portion in the form of an uninterrupted circular ring receiving said one end of the reel assembly, first and second rib portions extending from the annular portion, the rib portions fitting between edges of the side plate portion defining the cut-away, and a web portion between the rib portions connecting the rib portions to the annular portion, the mounting means including means for fixing the bushing member lengthwise in the cut-away and means for preventing lateral removal of the bushing member from the cut-away, the cut-away having a closed end and extending from the closed end to the outer periphery of the side plate portion in a direction generally opposite the direction of webbing draw-out.

2. A device according to claim 1, wherein the means for fixing the bushing member lengthwise in the cut-away includes a flange portion on the bushing member and interfitting pins and holes on the flange portion and side plate portion respectively.

3. A device according to claim 1, wherein the means for preventing lateral withdrawal of the bushing member from the cut-away includes ribs formed on the rib portions of the bushing member.

4. A device according to claim 3, wherein the ribs are formed on opposite sides of the rib portions whereby the ribs embrace said edges of the side plate portion.

5. A device as claimed in claim 1, wherein the rib portions are resilient and the means for fixing the bushing member lengthwise in the cut-away includes projections on the rib portions engaging recesses in said edges of the side plate portion.

6. A device as claimed in claim 1, claim 3, or claim 4, wherein the rib portions are resilient and the means for fixing the bushing member lengthwise in the cut-away includes a projection on at least one of said edges of the side plate portion adjacent the outer periphery thereof, said projection engaging the end of one of the rib portions of the bushing member.

7. A device as claimed in claim 1, wherein a part of the side plate portion adjacent the closed end of the cut-away is reinforced.

8. A device as claimed in claim 7, wherein said part of the side plate portion is reinforced by drawing-machining.

9. A device according to claim 1, wherein the base member has a bottom portion between the side wall portions, the bottom portion including a webbing draw-out slot.

10. A device according to claim 1 having a hole in each side plate portion for supporting a locking plate adapted to mesh with a latch plate of the reel assembly.